(12) United States Patent
Takagi

(10) Patent No.: US 7,990,537 B2
(45) Date of Patent: Aug. 2, 2011

(54) COLOR-MEASURING METHOD FOR BODY AND COLOR-MEASURING APPARATUS

(75) Inventor: Atsushi Takagi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 302 days.

(21) Appl. No.: 12/293,839

(22) PCT Filed: Mar. 23, 2007

(86) PCT No.: PCT/JP2007/057022
§ 371 (c)(1),
(2), (4) Date: Sep. 22, 2008

(87) PCT Pub. No.: WO2007/111379
PCT Pub. Date: Oct. 4, 2007

(65) Prior Publication Data
US 2010/0231912 A1    Sep. 16, 2010

(30) Foreign Application Priority Data
Mar. 23, 2006    (JP) .................................. 2006-081439

(51) Int. Cl.
*G01J 3/46*    (2006.01)
(52) U.S. Cl. ........................................ 356/425; 356/417
(58) Field of Classification Search .................. 356/417, 356/421, 425
See application file for complete search history.

(56) References Cited

U.S. PATENT DOCUMENTS

| | | | |
|---|---|---|---|
| 3,600,099 A * | 8/1971 | Schoeffel | 356/416 |
| 3,773,425 A * | 11/1973 | Bentley | 356/421 |
| 3,832,070 A * | 8/1974 | Cox | 356/421 |
| 4,003,660 A | 1/1977 | Christie, Jr. et al. | |
| 4,474,470 A * | 10/1984 | Brandt et al. | 356/425 |
| 4,886,366 A * | 12/1989 | Kogure | 356/425 |
| 5,118,183 A | 6/1992 | Cargill et al. | |
| 5,157,455 A * | 10/1992 | Macri et al. | 356/416 |
| 5,182,721 A * | 1/1993 | Kipphan et al. | 356/407 |

(Continued)

FOREIGN PATENT DOCUMENTS

JP    59-216024    12/1984

(Continued)

OTHER PUBLICATIONS

Extended European Search Report dated Aug. 18, 2010, for EP Appl. No. 07 74 0460.

*Primary Examiner* — Kara E Geisel
(74) *Attorney, Agent, or Firm* — Finnegan, Henderson, Farabow, Garrett & Dunner, LLP

(57) ABSTRACT

A reference-color measurement step of obtaining a reference-color measurement value by measuring a spectroscopic-radiation luminance of a light being emitted from a reference-color portion in a measurement direction, or a tristimulus value thereof, using a light-source-color measuring instrument, without irradiating the reference-color portion with a light source for measurement, in a predetermined measurement environment, is disclosed. An objective-portion measurement step of obtaining an objective-portion measurement value by measuring a spectroscopic-radiation luminance of a light being emitted from a measurement-objective portion in the measurement direction, or a tristimulus value thereof, using the light-source-color measuring instrument, without irradiating the measurement-objective portion with a light source for measurement, in the measurement environment, is also disclosed.

6 Claims, 4 Drawing Sheets

U.S. PATENT DOCUMENTS

| | | | |
|---|---|---|---|
| 6,760,103 B2 * | 7/2004 | Shakespeare et al. | 356/429 |
| 2006/0208199 A1 * | 9/2006 | Gallagher et al. | 250/458.1 |

FOREIGN PATENT DOCUMENTS

| | | |
|---|---|---|
| JP | 6-34436 | 2/1994 |
| JP | 7-50760 | 2/1995 |
| JP | 11-94698 | 4/1999 |
| JP | 2000-4938 | 1/2000 |
| JP | 2000-310564 | 11/2000 |
| JP | 2003-32445 | 1/2003 |
| JP | 2003-333355 | 11/2003 |
| JP | 3110576 | 5/2005 |
| WO | WO 99/30136 | 6/1999 |
| WO | WO 99/30137 | 6/1999 |

\* cited by examiner

_US 7,990,537 B2_

COLOR-MEASURING METHOD FOR BODY AND COLOR-MEASURING APPARATUS

CROSS-REFERENCE TO RELATED APPLICATIONS

This application is a national phase application of International Application No. PCT/JP2007/057022, filed Mar. 23, 2007, and claims the priority of Japanese Application No. 2006-081439, filed Mar. 23, 2006, the contents of both of which are incorporated herein by reference.

TECHNICAL FIELD

The present invention relates to a color-measuring method for a body. A color-measuring method for a body according to the present invention can be utilized suitably for color reproduction in order to reproduce predetermined colors in an apparatus for doing color printing, color displaying, and the like, for instance.

BACKGROUND ART

In general, in the case of carrying out color reproduction with display, printer, and the like, such a method has been adopted that, based on the three-primary-color theory, an original tristimulus value and an output tristimulus value are coupled (see Japanese Unexamined Patent Publication (KOKAI) Gazette No. 2003-333,355, and Japanese Unexamined Patent Publication (KOKAI) Gazette No. 7-50,760, for instance).

In such color reproduction, in order to identify the original tristimulus value, a color of a body is measured using a spectroscopic color-measuring method, for instance. In this spectroscopic color-measuring method, a spectrophotometer, which has a built-in specific light source for measurement and which is adapted for measuring body colors, has been used.

Specifically, in the spectroscopic color-measuring method, a light is emitted from the specific light source for measurement, which is built-in inside the spectrophotometer serving as a body-color measuring instrument, to a body, and thereby a reflectivity (spectroscopic-solid-angle reflectivity) for every wavelength of a reflected light from the body (for every spectrum thereof) is measured in a visible-light wavelength range of 400-700 nm, for instance. And, tristimulus values are found by means of such a calculation that values of the reflectivities (spectroscopic distribution) are multiplied by a color-matching function to carry out integration.

A body color can be determined depending by means of the dispersion of light source and the reflectivity of the body, that is, by means of (dispersion of light source) X (reflectivity of body).

However, a body including fluorescent material has such a property that, in the low-wavelength section of visible-light range, it is excited to increase the reflectivity by means of the ultraviolet-range energy of light source (see FIG. 8). Accordingly, in the case of exposing a body including fluorescent material to a light source, the reflectivity has changed depending on a property of the light source (ultraviolet content).

Here, there is such a case that ultraviolet is included abundantly in the light source of living room in general; on the contrary the ultraviolet content is less in the measurement light source of the above-described spectrophotometer serving as a body-color measuring instrument. Accordingly, even when measuring the reflectivity of body including fluorescent material while irradiating it with a specific light source for measurement from this spectrophotometer, the value has become different from the actual reflectivity. That is, when the light source of living room differs from the measurement light source of spectrophotometer, a color, which is different from a color of the body including fluorescent material that an observer can view actually, has come to be measured with the spectrophotometer.

For example, as illustrated in FIG. 7, in the "D65" light serving as the light source of a living room (the curve "A" in FIG. 7, that is, a tungsten light, for instance), the ultraviolet-region energy is large; on the other hand, in the "A" light serving as the measurement light source of spectrophotometer (the curve "B" in FIG. 7), the ultraviolet-region energy is small. And, as illustrated in FIG. 8, in the case of body including fluorescent material, the reflectivity of the "D65" light serving as the light source of a living room (the curve "A" in FIG. 8) is larger in the low-wavelength section of visible-light range than the reflectivity of the "A" light serving as the measurement light source of spectrophotometer therein (the curve "B" in FIG. 8).

Therefore, even when identifying a color of a body including fluorescent material using a spectrophotometer for body-color measurement that possesses a specific light source for measurement, the color of the body has become different from an actual color of the body that an observer is viewing in a living room, and thereby there has been such a problem that it is not possible to accurately measure a color of body including fluorescent material.

DISCLOSURE OF THE INVENTION

The present invention has been done in view of the aforementioned circumstances, and it is a technical assignment to be solved to provide a color-measuring method for body that can, even when measuring a color of such a body, like a body including a fluorescent material, whose reflectivity has changed depending on the type of light source, measure the color of such a body accurately.

A color-measuring method for body according to the present invention, which solves the aforementioned assignment is a body color-measuring method of measuring a color of light being emitted from a body within a case that is adapted into an irradiation condition being equivalent to that of an environment where an observer is present, and which is characterized in that it is equipped with:

a reference-color measurement step of obtaining a reference-color measurement value by measuring a spectroscopic-radiation luminance of a light being emitted from a reference-color portion in a measurement direction, or a tristimulus value thereof, using a light-source-color measuring instrument, within said case;

an objective-portion measurement step of obtaining an objective-portion measurement value by measuring a spectroscopic-radiation luminance of a light being emitted from a measurement-objective portion in said measurement direction, or a tristimulus value thereof, using said light-source-color measuring instrument, within said case;

a color identification step of finding a color of said measurement-objective portion by means of computation from a ratio of said objective-portion measurement value with respect to said reference-color measurement value;

a measurement-objective substance is a patched-color sheet in which a plurality of said measurement-objective portions comprising a plurality of different colors, and a plurality of said reference-color portions are arranged;

spectroscopic-radiation luminances of a plurality of said reference-color portions, or tristimulus values thereof, are measured at said reference-color measurement step, thereby taking an averaged value of them as said reference-color measurement value; and a spectroscopic-radiation luminance, or a tristimulus value, is measured for each of a plurality of said measurement-objective portions at said objective-portion measurement step, thereby obtaining a plurality of the objective-portion measurement values.

According to this color-measuring method for body, the reference-color measurement step, and the objective-portion measurement step are executed using a light-source-color measuring instrument, which does not have any built-in light source for measurement, within the case that is adapted into an irradiation condition being equivalent to that of an environment where an observer is present. That is, according to the body-color-measuring method of the present invention, spectroscopic-radiation luminances of lights being emitted from the reference-color portion and measurement-objective portion, or tristimulus values thereof, are measured using the light-source-color measuring instrument, but without emitting any specific light source for measurement from this light-source-color measuring instrument, within the case that is adapted into an irradiation condition being equivalent to that of an environment where an observer is present.

Thus, according to the body-color-measuring method of the present invention, since the reference-color measurement value, and the objective-portion measurement value are obtained using the light-source-color measuring instrument, but without emitting any specific light source for measurement from this light-source-color measuring instrument, and thereby a body color of body is found from the measurement values by means of computation, such an accurate measurement that does not include any adverse effects (measurement errors) resulting from the measurement light source becomes possible even in the case of measuring a color of such body, like a body including fluorescent material, that the reflectivity has changed depending on the type of light source.

Therefore, in accordance with the body-color-measuring method of the present invention, even in the case of measuring a color of such body, like a body including fluorescent material, that the reflectivity has changed depending on the type of light source, it is possible to accurately measure a color of the body that an observer is viewing actually in an environment where the observer is present. Hence, when the method according to the present invention is executed and then the measurement outcome is applied to a color management system (CMS) that is based on colorimetric color reproduction, it is possible to materialize optimum color reproduction for the environment where the observer is present.

In a preferable aspect of the color-measuring method for body according to the present invention, a reference-color measurement value $L_w(\lambda)$ of a spectroscopic-radiation luminance is obtained by measuring a spectroscopic-radiation luminance of a light being emitted from said reference-color portion using a spectroscopic-radiation luminance meter as said light-source-color measuring instrument at said reference-color measurement step;

an objective-portion measurement value $L_{01}(\lambda)$ of a spectroscopic-radiation luminance is obtained by measuring a spectroscopic-radiation luminance of a light being emitted from said measurement-objective portion by means of said spectroscopic-radiation luminance meter at said objective-portion measurement step; and a spectroscopic-radiation luminance factor $\beta(\lambda)$ is found from said reference-color measurement value $L_w(\lambda)$ and said objective-portion measurement value $L_{01}(\lambda)$ using a known spectroscopic-radiation luminance factor $\beta_w(\lambda)$ of said reference-color portion, the spectroscopic-radiation luminance factor $\beta(\lambda)$ serving as a reflectivity-equivalent value that is equivalent to a spectroscopic-solid-angle reflectivity of said measurement-objective portion, and thereafter a color of the measurement-objective portion is found from the spectroscopic-radiation luminance factor $\beta(\lambda)$ and a color-matching function at said color identification step.

When finding a spectroscopic-radiation luminance factor $\beta(\lambda)$, which serves as a reflectivity-equivalent value that is equivalent to a spectroscopic-solid-angle reflectivity of the measurement-objective portion, using a spectroscopic-radiation luminance meter as the light-source-color measuring instrument and then finding a color of the measurement-objective portion from the spectroscopic-radiation luminance factor $\beta(\lambda)$ and a color-matching function, it is possible to more accurately identify a color that an observer can view.

In the case of thus obtaining the reference-color measurement value $L_w(\lambda)$ of spectroscopic-radiation luminance and the objective-portion measurement value $L_{01}(\lambda)$ of spectroscopic-radiation luminance, it is preferable that, when taking a theoretical value of a spectroscopic-radiation luminance of perfectly-diffuse reflective surface as $L^*_w(\lambda)$ and taking the spectroscopic-radiation luminance factor of said reference-color portion as $\beta_w(\lambda) = L_w(\lambda)/L^*_w(\lambda)$, the spectroscopic-radiation luminance factor $\beta(\lambda)$ of said measurement-objective portion can be found by means of Equation (1) below at said color identification step.

$$\beta(\lambda) = L_{01}(\lambda)/(L_w(\lambda)/\beta_w(\lambda)) \qquad (1)$$
$$= L_{01}(\lambda)/\{L_w(\lambda) \cdot (L^*_w(\lambda)/L_w(\lambda))\}$$
$$= L_{01}(\lambda)/L^*_w(\lambda)$$

Moreover, in the case of finding a color of the measurement-objective portion from the thus obtained spectroscopic-radiation luminance factor $\beta(\lambda)$ of the measurement-objective portion, it is preferable that a color of the measurement-objective portion can be found as a relative value by means of Equation (2) below.

[Mathematical Formula 1]

$$\begin{pmatrix} X \\ Y \\ Z \end{pmatrix} = \int \beta(\lambda) \begin{pmatrix} \bar{x}(\lambda) \\ \bar{y}(\lambda) \\ \bar{z}(\lambda) \end{pmatrix} d\lambda \qquad (2)$$

When a color of the measurement-objective portion can be thus found as a relative value, it becomes possible to identify a color, which possesses certain brightness that is not dependent on the brightness of measurement environment, because the brightness of the color according to the measurement outcome does not change due to the brightness of measurement environment.

Moreover, when the tristimulus values X, Y and Z of an XYZ color specification system are thus found, it is possible to readily convert these into the other color specification systems, such as an L*a*b* color specification system, a Munsell color specification system and an Luv color specification system.

Further, by using a spectroscopic-radiation luminance meter as the light-source-color measuring instrument, a highly-accurate measurement becomes possible.

In a preferable aspect of the color-measuring method for body according to the present invention, a reference-color measurement value ($X_w$, $Y_w$, $Z_w$) of a tristimulus value is obtained by measuring a tristimulus value of a light being emitted from said reference-color portion using a color meter as said light-source-color measuring instrument at said reference-color measurement step;

an objective-portion measurement value (X', Y', Z') of a tristimulus value is obtained by measuring a tristimulus value of a light being emitted from said measurement-objective portion by means of said color meter at said objective-portion measurement step; and a color of said measurement-objective portion is found as a relative value by means of Equation (3) below from said reference-color measurement value ($X_w$, $Y_w$, $Z_w$) and said objective-portion measurement value (X', Y', Z') using ($X_w$, $Y^*_w$, $Z_w$), a theoretical value of a tristimulus value of perfectly-diffuse reflective surface, and $r = Y^*_w / Y_w$, a known calibrated value for said reference-color portion.

[Mathematical Formula 2]

$$\begin{pmatrix} X \\ Y \\ Z \end{pmatrix} = \begin{pmatrix} X' \\ Y' \\ Z' \end{pmatrix} \times \frac{1}{Y_w \cdot r} \qquad (3)$$

$$= \begin{pmatrix} X' \\ Y' \\ Z' \end{pmatrix} \times \frac{1}{Y^*_w}$$

$$= \begin{pmatrix} X'/Y^*_w \\ Y'/Y^*_w \\ Z'/Y^*_w \end{pmatrix}$$

When a color of the measurement-objective portion can thus be found as a relative value, it becomes possible to identify a color, which possesses certain brightness that is not dependent on the brightness of a measurement environment, because the brightness of the color according to the measurement outcome does not change due to the brightness of the measurement environment.

Moreover, when using a color meter as the light-source-color measuring instrument, the measuring instrument becomes less expensive and compact.

Further, when the tristimulus values X, Y and Z of an XYZ color specification system are found, it is possible to readily convert these into the other color specification systems, such as an L*a*b* color specification system, a Munsell color specification system and an Luv color specification system.

According to the body color-measuring method of the present invention, the measurement in said reference-color measurement step, and the measurement in said objective-portion measurement step are executed within the case that is adapted into an irradiation condition being equivalent to that of an environment where an observer is present.

Accordingly, an accurate measurement, which is not affected by environmental changes outside of the case, becomes possible under such a stable irradiation condition being inside of the case.

In the color-measuring method for body according to the present invention, a measurement-objective substance is a patched-color sheet in which a plurality of said measurement-objective portions comprising a plurality of different colors, and a plurality of said reference-color portions are arranged;

spectroscopic-radiation luminances of a plurality of said reference-color portions, or tristimulus values thereof, are measured at said reference-color measurement step, thereby taking an averaged value of them as said reference-color measurement value; and a spectroscopic-radiation luminance, or a tristimulus value, is measured for each of a plurality of said measurement-objective portions at said objective-portion measurement step, thereby obtaining a plurality of the objective-portion measurement values.

Thus, it is possible to accurately measure a plurality of colors in the patched-color sheet.

A color-measuring method for body according to the present invention is a body color-measuring method of measuring a color of light being emitted from a body in an environment where an observer is present, and is characterized in that it is equipped with:

a reference-color measurement step of obtaining a reference-color measurement value by measuring a spectroscopic-radiation luminance of a light being emitted from a reference-color portion in a measurement direction, or a tristimulus value thereof, using a light-source-color measuring instrument, in said environment;

an objective-portion measurement step of obtaining an objective-portion measurement value by measuring a spectroscopic-radiation luminance of a light being emitted from a measurement-objective portion in said measurement direction, or a tristimulus value thereof, using said light-source-color measuring instrument, in said environment; and a color identification step of finding a color of said measurement-objective portion by means of computation from a ratio of said objective-portion measurement value with respect to said reference-color measurement value;

a measurement-objective substance is a patched-color sheet in which a plurality of said measurement-objective portions comprising a plurality of different colors, and a plurality of said reference-color portions are arranged;

spectroscopic-radiation luminances of a plurality of said reference-color portions, or tristimulus values thereof, are measured at said reference-color measurement step, thereby taking an averaged value of them as said reference-color measurement value; and a spectroscopic-radiation luminance, or a tristimulus value, is measured for each of a plurality of said measurement-objective portions at said objective-portion measurement step, thereby obtaining a plurality of said objective-portion measurement values.

According to this color-measuring method for a body, the reference-color measurement step, and the objective-portion measurement step are executed using the light-source-color measuring instrument that does not have any built-in light source for measurement, not within a case that is adapted into an irradiation condition being equivalent to that of an environment where an observer is present, but in an environment where an observer is present. That is, according to this color-measuring method for body, spectroscopic-radiation luminances of lights being emitted from the reference-color portions and measurement-objective portions, or tristimulus values thereof, are measured using the light-source-color measuring instrument, but without emitting any specific light source for measurement from this light-source-color measuring instrument, in the environment where the observer is. Moreover, according to this color-measuring method for body, since, regarding the patched-color sheet in which a plurality of the measurement-objective portions comprising a plurality of different colors, and a plurality of the reference-color portions are arranged, an averaged value for a plurality of the reference-color portions is taken as the reference-color measurement value, and additionally since the objective-portion measurement value is obtained for each of a plurality of the measurement-objective portions, it is possible to accurately measure a plurality of different colors in the patched-color sheet. Therefore, when an environment where an observer is present is stabilized, by means of executing this color-measuring method for a body in the stabilized environment, it is possible to accurately measure colors of the patched-color sheet that the observer is viewing actually in the environment. Hence, when the measurement outcomes are applied to a color management system (CMS) that is based on colorimetric color reproduction, it is possible to materialize optimum color reproduction in the environment where the observer is present.

BEST MODE FOR CARRYING OUT THE INVENTION

Figure 1:
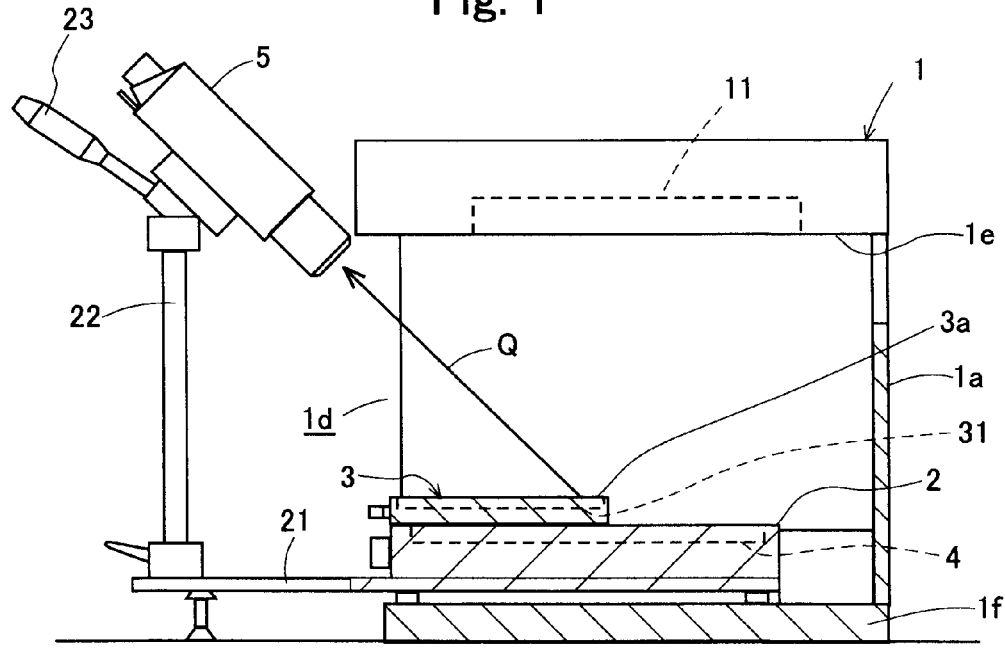
FIG. 1 schematically illustrates a color-measuring apparatus, which is used for a color-measuring method that is directed to an embodiment according to the present invention, and is a side view that displays a part thereof in cross section.
Figure 2:
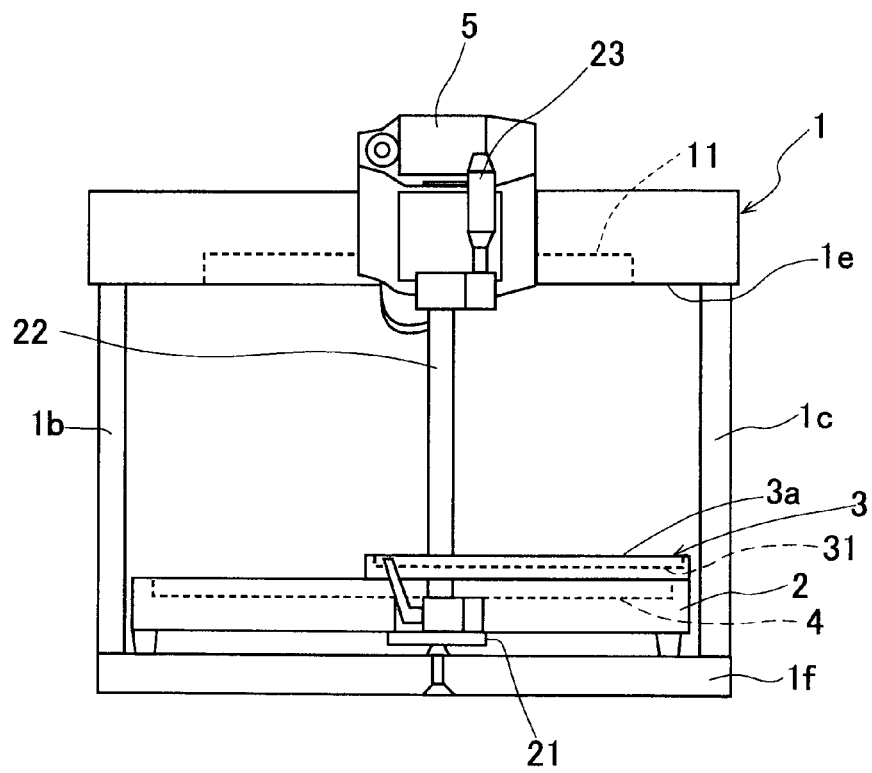
FIG. 2 schematically illustrates the color-measuring apparatus, which is used for the color-measuring method that is directed to said embodiment, and is a front view when viewing FIG. 1 from the left.

Hereinafter, specific embodiments according to the present invention will be explained while referring to the drawings.

Embodiment No. 1

The present embodiment is one for measuring respective colors in a patched-color sheet that serves as a measurement-objective substance.

First of all, a color-measuring apparatus illustrated in FIG. 1-FIG. 6, which is used for the color-measuring method that is directed to the present embodiment will be explained. This color measuring apparatus is equipped with: a case 1; a base table 2 being disposed within the case 1; a movable retainer table 3 being disposed on the base table 2, and possessing a retainer surface 3a on which a patched-color sheet 8 serving as a measurement-objective substance is to be retained; a driver means 4 for reciprocating the movable retainer table 3 in the X-direction and in the Y-direction; a light-source-color measuring instrument 5 being supported to the base table 2, and being capable of measuring colors of lights being emitted from the measurement-objective substance, which is retained on the movable retainer table 3, in a measurement direction; a controller means 6 for controlling the driver means 4 and the light-source-color measuring instrument 5; and a displayer means 7 for displaying measurement outcomes.

The case 1 is provided with a back wall surface 1a and both left and right surfaces 1b and 1c that surround the side faces, thereby having a forward opening 1d. Moreover, in a ceiling wall surface 1e of the case 1, there is provided a measurement environment in which an observer is present, that is, a light source 11 for illumination that is identical with a light source for illumination that a living room is equipped with where an observer is present. Thus, the inside of the case 1 is adapted into being under an illumination condition that is equivalent to a measurement environment in which an observer is present.

The base table 2 is placed on a floor surface 1f of the case 1; one of the opposite end sides is disposed within the case 1; and additionally the other one of the opposite end sides is equipped with a plate-shaped body 21, which sticks out through the forward opening 1a of the case 1 forward (the left direction in FIG. 1), integrally.

Figure 3:
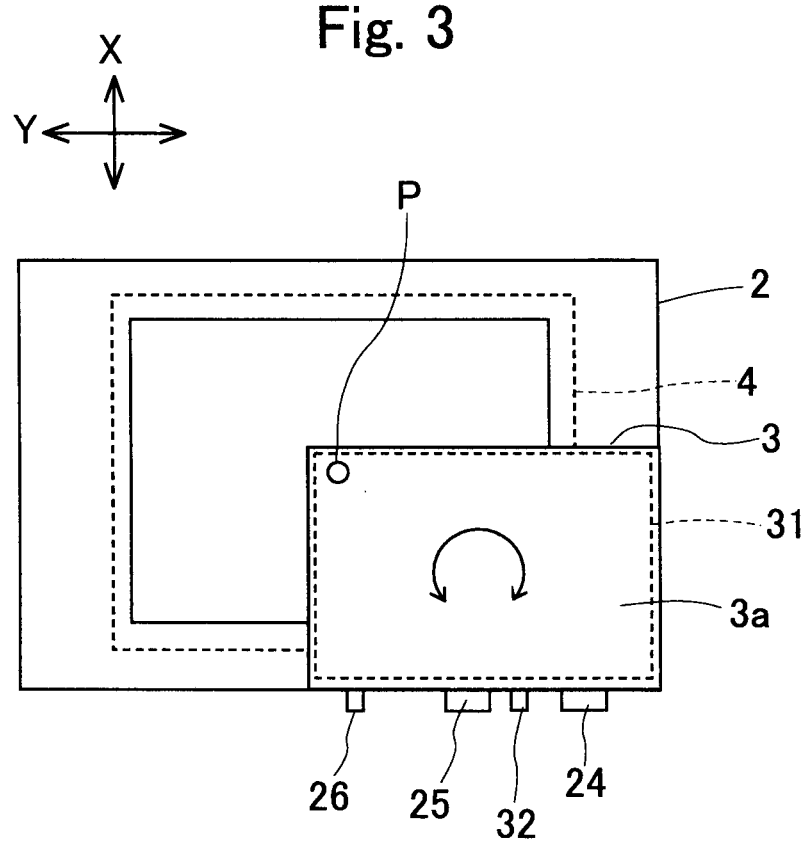
FIG. 3 is a plan view for schematically illustrating a base table of the color-measuring apparatus, which is used for the color-measuring method that is directed to said embodiment and a movable retainer table thereof.
Figure 4:
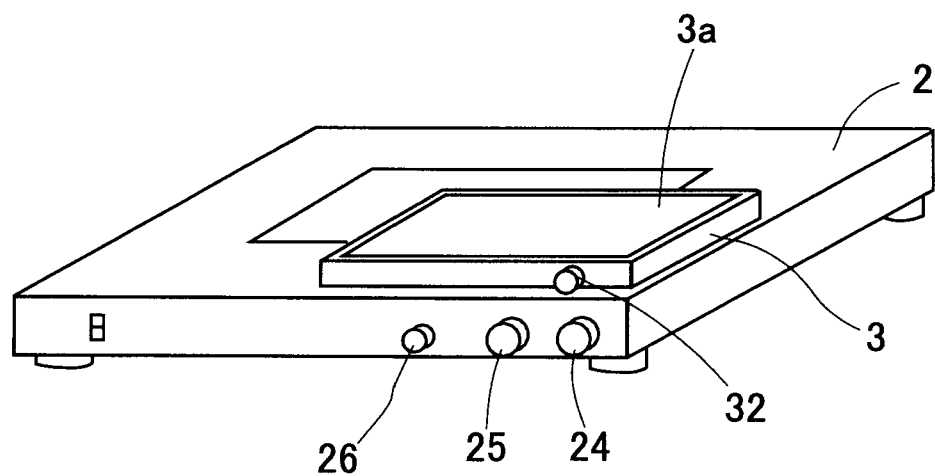
FIG. 4 is a perspective view for schematically illustrating the base table of the color-measuring apparatus, which is used for the color-measuring method that is directed to said embodiment and the movable retainer table thereof.
Figure 5:
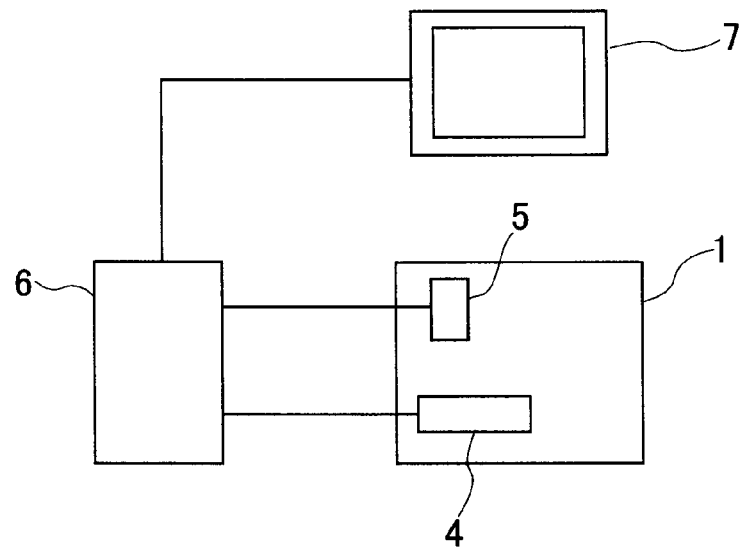
FIG. 5 is a block diagram for schematically illustrating an overall construction of the color-measuring apparatus, which is used for the color-measuring method that is directed to said embodiment.

The movable retainer table 3 is disposed on the base table 2 reciprocably in the X-direction (in the horizontal direction, i.e., in the left/right direction in FIG. 3 illustrating the plan view of the base table 2) and in the Y-direction (in the vertical direction, i.e., in the up/down direction in FIG. 3 illustrating the plan view of the base table 2), X-direction and Y-direction which cross orthogonally to each other. The driver means 4, which reciprocates the movable retainer table 3 in the X-direction and in the Y-direction, is built-in inside the base table 2. As for this driver means 4, although it is not limited in particular as far as being those which can reciprocate the movable retainer table 3 in the X-direction and in the Y-direction, it can be constituted of an ordinary driver means (motor and gears, and the like), for instance, that has been used for a so-called XY table.

Moreover, the movable retainer table 3 is made rotatable about a rotary center, which the center of the movable retainer table 3 makes, on the base table 2 within a plane that includes the X-direction and the Y-direction. A rotary mechanism for rotating the movable retainer table 3 is not limited in particular; for example, however, it is possible to adopt a rotary mechanism which is equipped with: a first rotary shaft one of whose opposite end sides is fixed to a later-described rotary-angle adjuster knob 32; a first gear being fixed to the other one of the opposite end sides of this first rotary shaft, thereby being made rotatable about the first rotary shaft; a second rotary shaft one of whose opposite end sides is fixed to the movable retainer table 3 in such a direction that crosses the first rotary shaft orthogonally; and a second gear being fixed to the other one of the opposite end sides of this second rotary shaft, and meshing with the first gear, thereby being made rotatable about the second rotary shaft crossing the first rotary shaft orthogonally.

In addition, the movable retainer table 3 is equipped with an electrostatic attracter means 31 for electrostatically attracting the patched-color sheet 8 serving as a measurement-objective substance onto the retainer surface 3a. This electrostatic attracter means 31 can be constituted of vacuum system or "Cueron" system (produced by TAIHEI KAGAKU CORPORATION).

Note that the base table 2 is equipped with; an X-direction transfer switch 24 for driving the driver means 4 by means of an observer's manual operation to transfer the moveable retainer table 3 in the X-direction; a Y-direction transfer switch 25 for driving the driver means 4 by means of an observer's manual operation to transfer the movable retainer table 3 in the Y-direction; and an attracter switch 26 for actuating the electrostatic attracter means 31 by means of an observer's manual operation. Moreover, the movable retainer table 3 is equipped with a rotary-angle adjuster knob 32 for rotating the movable retainer table 3 by means of an observer's manual operation.

The light-source-color measuring instrument 5 is retained to a stand 22, which is mounted upright on the plate-shaped body 21 of the base table 2, so that the focus of the light-source-color measuring instrument 5 agrees with a measurement position "P," which is positioned at the center of the base table 2, and so that the focus falls on the measurement position "P" from a 45-degree oblique direction with respect to the surface of the base table 2. Thus, the light-source-color measuring instrument 5 is adapted into being capable of measuring a color of light, which is emitted from a position that corresponds to the measurement position "P" in the patched-color sheet 8 being retained on the movable retainer table 3, in a measurement direction (in the arrow "Q" direction in FIG. 1, and the 45-degree oblique direction being headed toward the light-source-color measuring instrument 5 from the measurement position "P" in the base table 2). Note that the height at which this light-source-color measuring instrument 5 is retained, and the direction in which it is retained are adjustable by means of an adjuster lever 23, or the like, with which the stand 22 is equipped.

In the present embodiment, as the light-source-color measuring instrument 5, a spectroscopic-radiation luminance meter, which does not possess any light source for measurement, is adopted.

The controller means 6 comprises a personal computer, which is equipped with a CPU, an input means (keyboard), and the like. This controller means 6 is connected to the driver means 4, light-source-color measuring instrument 5 and displayer means (display monitor) 7, controls the position of the movable retainer table 3 in the X-direction and Y-direction and the measurement by means of the light-source-color measuring instrument 5 automatically, and additionally lets the displayer means 7 display the resulting measurement outcomes.

Moreover, in the patched-color sheet 8 that serves as a measurement-objective substance, a plurality of measurement-objective portions 8a comprising a plurality of different colors, and a plurality of reference-color portions 8b are arranged at the paper surface. Although a color of the reference-color portions 8b is not limited in particular, it can suitably be adapted into being a white color. In this patched-color sheet 8, the reference-color portions 8b are arranged so that, when measuring the respective patches in a certain order, the intervals between them become equal substantially in that order. For example, when measuring the patched-color sheet 8, this can be done in the following manner: a patch of a first piece of the reference-color portions 8b is measured first off and thereafter patches of 10 pieces of the measurement-objective portions 8a are measured; and then a patch of a second piece of the reference-color portions 8b is measured subsequently and thereafter patches of pieces of the measurement-objective portions 8a are measured similarly; and then a patch of a third piece of the reference-color portions 8b is measured subsequently; and thereby the reference-color portions 8b are arranged so that the intervals between them become equal substantially in the order of measuring the respective patches.

Figure 6:
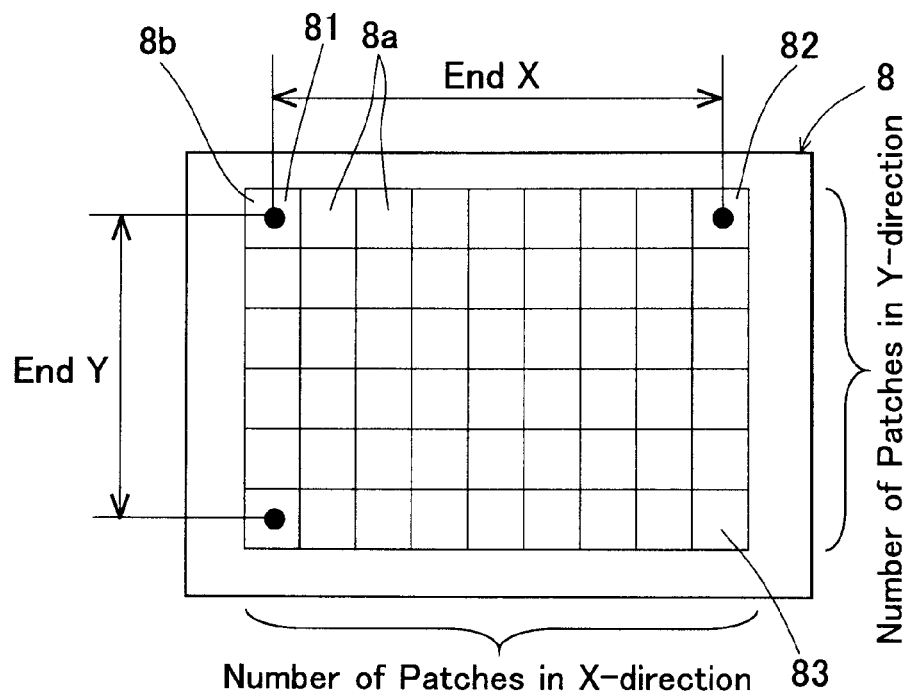
FIG. 6 is a plan view of a patched-color sheet serving as a measurement-objective substance, patched-color sheet which is used in said embodiment.
Figure 7:
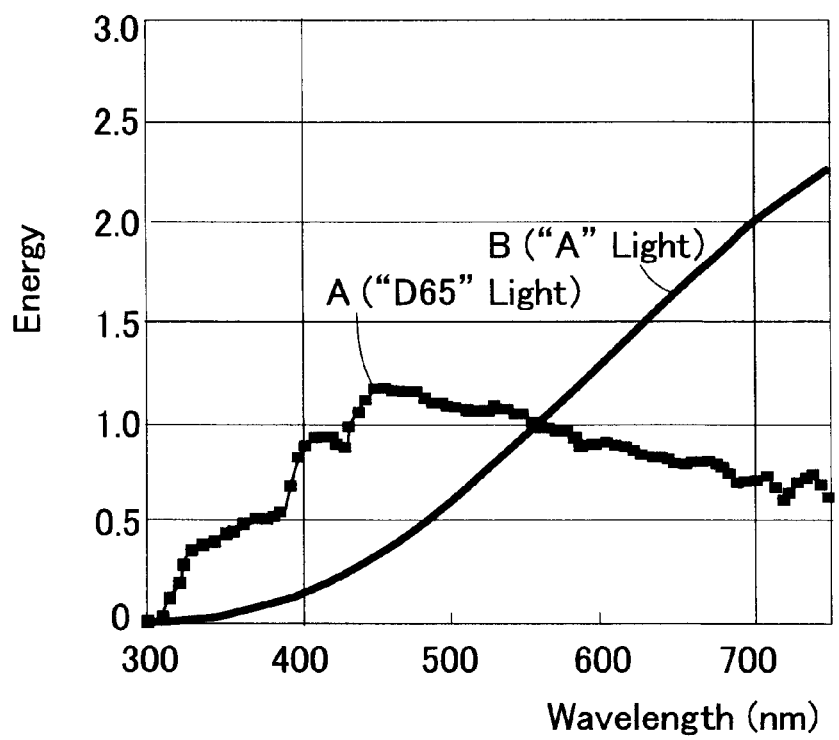
FIG. 7 is a diagram for illustrating relationships between wavelength and energy.
Figure 8:
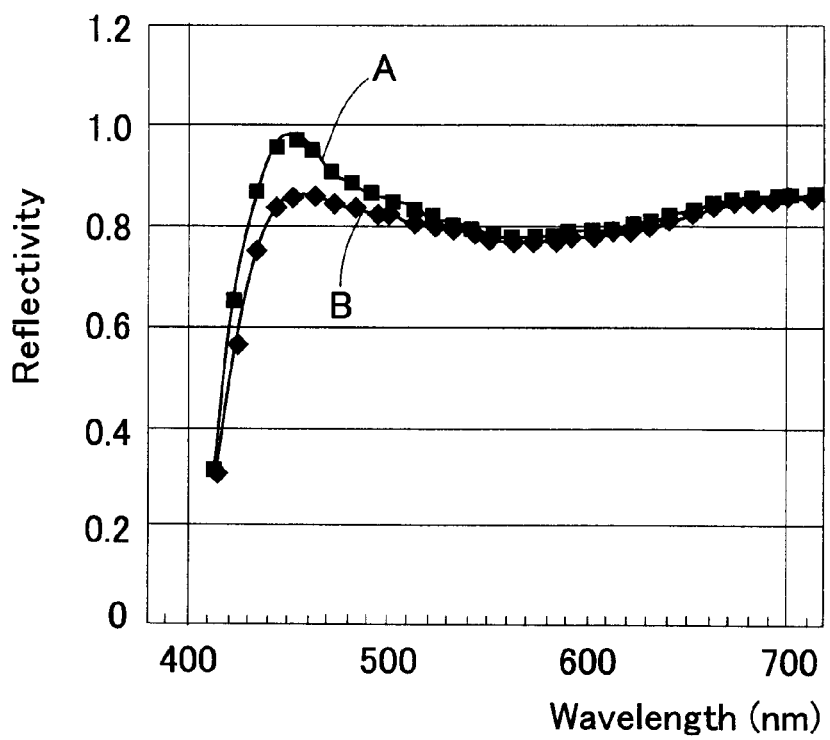
FIG. 8 is a diagram for illustrating relationships between wavelength and reflectivity.

As illustrated in FIG. 6, note that, in the patched-color sheet 8, the upper left patch 81 turns into a measurement starting point; the upper right patch 82 turns into an X-direction measurement ending point; and the lower right patch 83 turns into a Y-direction measurement ending point. That is, when color-measuring the patched-color sheet 8, the measurement is started at the upper left patch 81, and then a patch that is right-hand neighbor to the upper left patch 81 is measured by means of transferring the movable retainer table 3 in the X-direction after measuring the upper left patch 81. And, when measuring the patches of the uppermost row has been finished by measuring them one after another up to the upper right patch 82, a patch that is under the upper left patch 81 is measured by means of transferring the movable retainer table 3 in the X-direction and in the Y-direction, and thereafter the patches of the second row from the top are measured by means of transferring the movable retainer table 3 in the X-direction. These operations are repeated to measure patches down to the lower right patch 83 that is in the lowermost row. Moreover, in FIG. 6, "EndX" is the maximum transferable distance (mm) that the movable retainer table 3 can transfer in the X-direction, and "EndY" is the maximum transferable distance (mm) that the movable retainer table 3 can transfer in the Y-direction.

A color-measuring method using the color-measuring apparatus having the aforementioned construction will be hereinafter explained.

First of all, after placing the patched-color sheet 8 on the movable retainer table 3, the attracter switch 26 is turned on to attract the patched-color sheet 8 onto the retainer surface 3a by means of the electrostatic attracter means 31. And, by means of adjusting the rotary-angle adjuster knob 32 repeatedly, the movable retainer table 3 is rotated by a predetermined angle in a predetermined direction so that, when the X-direction transfer switch 24 is turned on to transfer the movable retainer table 3 in the X-direction, the point of regard of the light-source-color measuring instrument 5 scans the patches of the patched-color sheet 8 accurately in the horizontal direction (X-direction) and additionally so that, when the Y-direction transfer switch 25 is turned on to transfer the movable retainer table 3 in the Y-direction, the point of regard of the light-source-color measuring instrument 5 scans the patches of the patched-color sheet 8 accurately in the vertical direction (Y-direction).

Moreover, by means of operating the X-direction transfer switch 24 and the Y-direction transfer switch 25, the movable retainer table 3 is transferred in the X-direction and in the Y-direction so as to position the upper left patch 81 in the patched-color sheet 8 at the measurement position "P," and the resulting position is input into the controller means 6 and is registered therewith as a measurement starting point. Similarly, the movable retainer table 3 is transferred in the X-direction and in the Y-direction so as to position the upper right patch 82 in the patched-color sheet 8 at the measurement position "P," and the resulting position is input into the controller means 6 and is registered therewith as an X-direction measurement ending point. Similarly, the movable retainer table 3 is transferred in the X-direction and in the Y-direction so as to position the lower right patch 83 in the patched-color sheet 8 at the measurement position "P," and the resulting position is input into the controller means 6 and is registered therewith as a Y-direction measurement ending point. Note that, through these operations, the value of "EndX" (the distance from the left-end patch to the right-end patch) and the value of "EndY" (the distance from the upper-end patch to the lower-end patch) are memorized in the controller means 6.

Further, the number of the X-direction patches in the patched-color sheet 8 is input into the controller means 6 and is registered therewith as a number of X-direction measurement points. Similarly, the number of the Y-direction patches in the patched-color sheet 8 is input into the controller means 6 and is registered therewith as a number of Y-direction measurement points.

And, the reference-color measurement step, the objective-portion measurement step, and the color identification step are executed while automatically controlling the position of the movable retainer table 3 in the X-direction and Y-direction and the measurement by means of the light-source-color measuring instrument 5 by means of the controller means 6 in an automatic mode, thereby measuring colors of the respective measurement objective portions 8a in the patched-color sheet 8; and then the resulting measurement outcomes are displayed on the displayer means 7 and additionally are memorized in the controller means 6.

At this moment, in said reference-color measurement step, a plurality of spectroscopic-radiation luminances of lights that are emitted from a plurality of the reference-color portions 8b being positioned at the measurement position "P" are measured by means of a spectroscopic-radiation luminance meter serving as the light-source-color measuring instrument 5, and an averaged value of them is obtained as a reference-color measurement value $L_w(\lambda)$ of a spectroscopic-radiation luminance.

Moreover, in said objective-portion measurement step, spectroscopic-radiation luminances of lights that are emitted from a plurality of the measurement-objective portions 8a being positioned at the measurement position "P" are measured respectively by means of a spectroscopic-radiation luminance meter serving as the light-source-color measuring instrument 5, and objective-portion measurement values $L_{o1}(\lambda)$ of a plurality of the spectroscopic-radiation luminances are obtained.

And, in said color identification step, spectroscopic-radiation luminance factors $\beta(\lambda)$, which serve as reflectivity-equivalent values that are equivalent to spectroscopic-solid-angle reflectivities of the respective measurement-objective portions 8a, are found respectively from said reference-color measurement value $L_w(\lambda)$ and said respective objective-portion measurement values $L_{o1}(\lambda)$ using known spectroscopic-radiation luminance factors $\beta_w(\lambda)$ of the reference-color portions 8b.

Specifically, when taking a theoretical value of a spectroscopic-radiation luminance of perfectly-diffuse reflective surface as $L*w$ (1) and taking said spectroscopic-radiation luminance factors of the reference-color portions 8b as $\beta_w(\lambda) = L_w(\lambda)/L*_w(\lambda)$, the spectroscopic-radiation luminance factors of the respective measurement-objective portions 8a, $\beta(\lambda) = L_{o1}(\lambda)/L*_w(\lambda)$, are found by means of said Equation (1).

Further, in said color identification step, colors of the respective measurement-objective portions 8a are found as relative values of tristimulus values in an XYZ color specification system by means of said Equation (2) from said spectroscopic-radiation luminance factors $\beta(\lambda)$ of the respective measurement-objective portions 8a and a color-matching function.

Thus, according the body-color-measuring method of the present embodiment, the spectroscopic-radiation luminances of the lights being emitted from the reference-color portions 8b and measurement-objective portions 8a are measured by executing the reference-color measurement step and objective-portion measurement step using a spectroscopic-radiation luminance meter that serves as the light-source-color measuring instrument 5, without irradiating the reference-color portions 8b and measurement-objective portions 8a with a light source for measurement. Accordingly, obtained at the reference-color measurement value $L_w(\lambda)$ being the reference-color measurement step, and the objective-portion measurement values $L_{o1}(\lambda)$ being obtained at the objective-portion measurement step are those that do not include any influences resulting from being irradiated with a light source for measurement. Therefore, even when the patched-color sheet 8 is one that includes a fluorescent material, the reference-color measurement value $L_w(\lambda)$, and the objective-portion measurement values $L_{o1}(\lambda)$ become accurate measurement values that do not include any adverse effects (measurement errors) resulting from a light source for measurement. Hence, it is possible to more accurately measure the respective colors of the patched-color sheet 8 that are being viewed by an observer actually.

Moreover, in the present embodiment, since it is possible to find the colors of the respective measurement-objective portions 8a as the relative values of tristimulus values in an XYZ color specification system, the brightness of the colors according to the measurement outcomes do not change at all due to the brightness of measurement environment. Accordingly, it becomes possible to identify colors with certain brightness that is not dependent on the brightness of measurement environment.

Note that the tristimulus values X, Y, Z being thus obtained can be readily converted into the other color specification systems, such as an L*a*b* color specification system and a Munsell color specification system.

Therefore, in accordance with the color-measuring method for body according to the present embodiment, it is possible to accurately measure the respective colors of the patched-color sheet 8, colors which an observer is viewing actually in an environment where the observer is present, even when the patched-color sheet 8 is one that includes a fluorescent material. Hence, when the measurement outcomes are applied to a color management system (CMS) that is based on colorimetric color reproduction, it becomes possible to materialize optimum color reproduction in the environment where the observer is.

Moreover, according to the present embodiment, since the measurement in said reference-color measurement step, and the measurement in said objective-portion measurement step are executed within the case 1 that is adapted into an irradiation condition being equivalent to that of an environment where an observer is present, an accurate measurement, which is not affected by environmental changes outside the case 1, becomes possible under such a stable irradiation condition being inside the case 1. Note that, when an environment in a living room, or the like, where an observer is present is stabilized, it is allowable to execute said reference-color measurement step, and said objective-portion measurement step in the environment (that is, at a living room where the observer is present, the living room possessing a certain measurement environment). Even in this case, it is possible to accurately measure respective colors of the patched-color sheet 8 that an observer is viewing actually in an environment where the observer is present; when the measurement outcomes are applied to a color management system (CMS) that is based on colorimetric color reproduction, it is possible to materialize optimum color reproduction in the environment where the observer is present.

Moreover, according to the present embodiment, it becomes possible to automatically measure the respective colors, which constitute the patched-color sheet 8, consecutively by means of said color-measuring apparatus.

In addition, according to the present embodiment, since a spectroscopic-radiation luminance meter is used as the light-source-color measuring instrument 5, a high-accuracy measurement becomes possible.

Embodiment No. 2

According to the present embodiment, a color luminance meter that serves as a color meter is used instead of using a spectroscopic-radiation luminance meter that serves as the light-source-color measuring instrument 5 in said Embodiment No. 1.

Specifically, in a color-measuring method for a body according to this embodiment, tristimulus values of lights being emitted from a plurality of the reference-color portions 8b are measured using a color luminance meter that serves as the light-source-color measuring instrument 5 at said reference-color measurement step, thereby obtaining an averaged value of them as a reference-color measurement value ($X_w$, $Y_w$, $Z_w$) of the tristimulus values.

Moreover, at said objective-portion measurement step, tristimulus values of lights being emitted from the respective measurement-objective portions 8a are measured by means of the color luminance meter that serves as the light-source-color measuring instrument 5, thereby obtaining objective-portion measurement values (X', Y', Z') of a plurality of the tristimulus values.

And, at said color identification step, colors of the respective measurement-objective portions 8a are found as relative values of tristimulus values in an XYZ color specification system by means of said equation (3) from the reference-color measurement value ($X_w$, $Y_w$, $Z_w$) and objective-portion measurement values (X', Y', Z') using ($X_w$, $Y^*_w$, $Z_w$), a theoretical value of a tristimulus value of perfectly-diffuse reflective surface, and $r = Y^*_w / Y_w$, a known calibrated value for said reference-color portions.

Moreover, according to the present embodiment, since a color meter is used as the light-source-color measuring instrument 5, the measuring instrument becomes compact and less expensive.

Since the other constructions and operations/effects are the same as those of said Embodiment No. 1, their explanations are omitted herein.

The invention claimed is:

1. A color-measuring method for measuring a color of light being emitted from a body within a case that is adapted into an irradiation condition being substantially equivalent to that of an environment where an observer is present, the method comprising:

a reference-color measurement step of obtaining a reference-color measurement value $L_w(\lambda)$ by measuring a spectroscopic-radiation luminance of a light being emitted from a reference-color portion in a measurement direction, or a tristimulus value thereof, using a light-source-color measuring instrument within said case;

an objective-portion measurement step of obtaining an objective-portion measurement value $L_{01}(\lambda)$ by measuring a spectroscopic-radiation luminance of a light being emitted from a measurement-objective portion in said measurement direction, or a tristimulus value thereof, using said light-source-color measuring instrument within said case;

a color identification step of finding a color of said measurement-objective portion by a computation from a ratio of said objective-portion measurement value $L_{01}(\lambda)$ with respect to said reference-color measurement value $L_w(\lambda)$; and providing a measurement-objective substance including a patched-color sheet in which a plurality of said measurement-objective portions comprising a plurality of different colors, and a plurality of said reference-color portions are arranged;

wherein spectroscopic-radiation luminances of a plurality of said reference-color portions, or tristimulus values thereof, are measured in said reference-color measurement step, thereby taking an averaged value of them as said reference-color measurement value $L_w(\lambda)$; and wherein a spectroscopic-radiation luminance, or a tristimulus value, is measured for each of a plurality of said measurement-objective portions at said objective-portion measurement step, thereby obtaining a plurality of the objective-portion measurement values.

2. The color-measuring method set forth in claim 1, wherein:

the reference-color measurement value $L_w(\lambda)$ of the spectroscopic-radiation luminance is obtained by measuring a spectroscopic-radiation luminance of a light being emitted from said reference-color portion by a spectroscopic-radiation luminance meter serving as said light-source-color measuring instrument in said reference-color measurement step;

the objective-portion measurement value $L_{01}(\lambda)$ of the spectroscopic-radiation luminance is obtained by measuring a spectroscopic-radiation luminance of a light being emitted from said measurement-objective portion by said spectroscopic-radiation luminance meter in said objective-portion measurement step; and a spectroscopic-radiation luminance factor $\beta(\lambda)$ is found from said reference-color measurement value $L_w(\lambda)$ and said objective-portion measurement value $L_{01}(\lambda)$ using a known spectroscopic-radiation luminance factor $\beta_w(\lambda)$ of said reference-color portion, the spectroscopic-radiation luminance factor $\beta(\lambda)$ serving as a reflectivity-equivalent value that is substantially equivalent to a spectroscopic-solid-angle reflectivity of said measurement-objective portion, and thereafter a color of the measurement-objective portion is found from the spectroscopic-radiation luminance factor $\beta(\lambda)$ and a color-matching function at said color identification step.

3. The color-measuring method set forth in claim 2, wherein when taking a value $L^*_w(\lambda)$ of a spectroscopic-radiation luminance of perfectly-diffuse reflective surface and taking the spectroscopic-radiation luminance factor of said reference-color portion as $\beta_w(\lambda) = L_w(\lambda)/L^*_w(\lambda)$, the spectroscopic-radiation luminance factor $\beta(\lambda)$ of said measurement-objective portion is found by the following equation:

$$\beta(\lambda) = L_{01}(\lambda)/(L_w(\lambda)/\beta_w(\lambda))$$
$$= L_{01}(\lambda)/\{L_w(\lambda) \cdot (L^*_w(\lambda)/L_w(\lambda))\}$$
$$= L_{01}(\lambda)/L^*_w(\lambda).$$

4. The color-measuring method for body set forth in claim 3, wherein a color of said measurement-objective portion is found as a relative value from the spectroscopic-radiation luminance factor $\beta(\lambda)$ of said measurement-objective portion and said color-matching function in said color identification step according to the following equation:

$$\begin{pmatrix} X \\ Y \\ Z \end{pmatrix} = \int \beta(\lambda) \begin{pmatrix} \bar{x}(\lambda) \\ \bar{y}(\lambda) \\ \bar{z}(\lambda) \end{pmatrix} d\lambda.$$

5. The color-measuring method set forth in claim 1, wherein:
- a reference-color measurement value $(X_w, Y_w, Z_w)$ of a tristimulus value is obtained by measuring a tristimulus value of a light being emitted from said reference-color portion by a color meter serving as said light-source-color measuring instrument in said reference-color measurement step;
- an objective-portion measurement value $(X', Y', Z')$ of a tristimulus value is obtained by measuring a tristimulus value of a light being emitted from said measurement-objective portion by said color meter in said objective-portion measurement step; and
- a color of said measurement-objective portion is found as a relative value from said reference-color measurement value $(X_w, Y_w, Z_w)$ and said objective-portion measurement value $(X', Y', Z')$ using $(X_w, Y^*_w, Z_w)$, a theoretical value of a tristimulus value of perfectly-diffuse reflective surface, and $r=Y^*_w/Y_w$, a known calibrated value for said reference-color portion according to the following equation:

$$\begin{pmatrix} X \\ Y \\ Z \end{pmatrix} = \begin{pmatrix} X' \\ Y' \\ Z' \end{pmatrix} \times \frac{1}{Y_w \cdot r} = \begin{pmatrix} X' \\ Y' \\ Z' \end{pmatrix} \times \frac{1}{Y^*_w} = \begin{pmatrix} X'/Y^*_w \\ Y'/Y^*_w \\ Z'/Y^*_w \end{pmatrix}.$$

6. A color-measuring method for measuring a color of light being emitted from a body in an environment where an observer is present, the method comprising:
- a reference-color measurement step of obtaining a reference-color measurement value $L_w(\lambda)$ by measuring a spectroscopic-radiation luminance of a light being emitted from a reference-color portion in a measurement direction, or a tristimulus value thereof, using a light-source-color measuring instrument in said environment;
- an objective-portion measurement step of obtaining an objective-portion measurement value $L_{O1}(\lambda)$ by measuring a spectroscopic-radiation luminance of a light being emitted from a measurement-objective portion in said measurement direction, or a tristimulus value thereof, using said light-source-color measuring instrument in said environment;
- a color identification step of finding a color of said measurement-objective portion by a computation from a ratio of said objective-portion measurement value $L_{O1}(\lambda)$ with respect to said reference-color measurement value $L_w(\lambda)$; and
- providing a measurement-objective substance including a patched-color sheet in which a plurality of said measurement-objective portions comprising a plurality of different colors, and a plurality of said reference-color portions are arranged;
- wherein spectroscopic-radiation luminances of a plurality of said reference-color portions, or tristimulus values thereof, are measured at said reference-color measurement step, thereby taking an averaged value of them as said reference-color measurement value; and
- wherein a spectroscopic-radiation luminance, or a tristimulus value, is measured for each of a plurality of said measurement-objective portions at said objective-portion measurement step, thereby obtaining a plurality of said objective-portion measurement values.

* * * * *